(12) United States Patent
Denifl et al.

(10) Patent No.: US 7,902,108 B2
(45) Date of Patent: Mar. 8, 2011

(54) PREPARATION OF OLEFIN POLYMERIZATION CATALYST COMPONENT

(75) Inventors: Peter Denifl, Gries am Brenner (AT); Timo Leinonen, Tolkkinen (FI)

(73) Assignee: Borealis Technology Oy, Porvoo (FI)

( * ) Notice: Subject to any disclaimer, the term of this patent is extended or adjusted under 35 U.S.C. 154(b) by 1222 days.

(21) Appl. No.: 10/481,313

(22) PCT Filed: Jun. 18, 2002

(86) PCT No.: PCT/EP02/06720
§ 371 (c)(1),
(2), (4) Date: Jun. 28, 2004

(87) PCT Pub. No.: WO03/000757
PCT Pub. Date: Jan. 3, 2003

(65) Prior Publication Data
US 2004/0242406 A1     Dec. 2, 2004

(30) Foreign Application Priority Data
Jun. 20, 2001   (EP) .................................... 01115000

(51) Int. Cl.
| | |
|---|---|
| *B01J 21/00* | (2006.01) |
| *B01J 23/00* | (2006.01) |
| *B01J 25/00* | (2006.01) |
| *B01J 29/00* | (2006.01) |
| *B01J 31/00* | (2006.01) |
| *B01J 37/00* | (2006.01) |
| *C08F 4/02* | (2006.01) |
| *C08F 4/60* | (2006.01) |

(52) U.S. Cl. ......... 502/103; 502/100; 502/102; 502/104; 502/115; 502/150

(58) Field of Classification Search .................. 502/100, 502/102, 103, 104, 105, 107, 109, 127, 115, 502/132–134, 150
See application file for complete search history.

(56) References Cited

U.S. PATENT DOCUMENTS

| | | | |
|---|---|---|---|
| 4,298,718 A | 11/1981 | Mayr et al. | |
| 4,315,874 A * | 2/1982 | Ushida et al. ................. | 502/134 |
| 4,399,055 A | 8/1983 | Matsuura et al. | |
| 4,481,342 A | 11/1984 | Invernizzi et al. | |
| 4,517,307 A | 5/1985 | Cuffiani et al. | |
| 5,188,999 A | 2/1993 | Duranel et al. | |
| 5,212,133 A | 5/1993 | Duranel et al. | |
| 5,382,557 A | 1/1995 | Masi et al. | |
| 6,294,682 B1 | 9/2001 | Rauleder et al. | |

FOREIGN PATENT DOCUMENTS

| | | |
|---|---|---|
| CN | 1068576 A | 2/1993 |
| EP | 0083074 A | 7/1983 |
| EP | 0255790 A | 2/1988 |
| EP | 0 688 794 B1 | 8/1988 |
| EP | 0 083 073 B1 | 10/1989 |
| EP | 0 281 524 B1 | 7/1990 |
| EP | 0 258 089 B1 | 10/1990 |
| EP | 0536840 A | 4/1993 |
| EP | 0 522 650 B1 | 9/1995 |
| EP | 0 533 806 B1 | 5/1998 |
| EP | 0 553 806 | 5/1998 |
| EP | 0 926 165 A1 | 6/1999 |
| EP | 0 856 013 B1 | 7/2000 |
| EP | 0 713 886 B1 | 7/2001 |
| WO | WO 97/14723 | 4/1997 |
| WO | WO 98/44009 | 10/1998 |
| WO | WO - 00/08073 | 2/2000 |
| WO | WO - 00/08074 | 2/2000 |
| WO | WO 01/55230 A1 | 8/2001 |

OTHER PUBLICATIONS

International Search Report for PCT/EP02/06720 mailed Oct. 24, 2002.
Boor, John Jr., "Ziegler-Natta Catalysts and Polymerizations," Academic Press 1979, p. 180.
Di Noto et al., "New Synthesis of a highly active δ-MgCl2/TiCl4/AlEt3 catalytic systems," Macromol. Chem. Phys., 197, 3827-3835 (1996).

* cited by examiner

*Primary Examiner* — James E McDonough
(74) *Attorney, Agent, or Firm* — McDonnell Boehnen Hulbert & Berghoff LLP

(57) ABSTRACT

A process for producing a Gp 2/transition metal olefin polymerisation catalyst component, in which a Gp 2 metal complex is reacted with a transition metal compound so as to produce an oil-in-oil emulsion, the disperse phase containing the preponderance of the Mg being solidified by heating to provide a catalyst component of excellent morphology. Polymerisation of olefins using a catalyst containing such a component is also disclosed. The process may be employed in the production of Ziegler-Natta catalysts.

31 Claims, 3 Drawing Sheets

PREPARATION OF OLEFIN POLYMERIZATION CATALYST COMPONENT

This invention relates to a process for the preparation of a particulate olefin polymerisation catalyst component, particularly one comprising a Gp 2 metal of the Periodic Table (IUPAC, Nomenclature of Inorganic Chemistry, 1989), a compound of a transition metal and an electron donor. The invention also relates to the use of such a catalyst component in the polymerisation of olefins.

BACKGROUND OF THE INVENTION

Processes for the preparation of such a catalyst component—as described, for instance, in WO 00/08073 and 00/08074—usually include a step in which a magnesium-Gp 4 metal-electron donor component is recovered by precipitation from solution, typically by contacting the solution with a large amount of an aliphatic hydrocarbon. However, such precipitation leads to a tar-like reaction product of low catalytic activity, that needs to be washed several times in order to decrease the amount of inactive Gp IVB metal complex. Aromatic hydrocarbons have also been used for the precipitation, but they lead to a very finely divided precipitate which is difficult to deposit. Worse still, it is difficult to carry out such precipitation in a controlled and reproducible manner, leading to unsatisfactory product morphology. Moreover variable and low concentrations of catalyst constituents such as butyl chloride may result, as a consequence of precipitation evaporative removal of aliphatic solvent.

DESCRIPTION OF THE INVENTION

Figure 1:
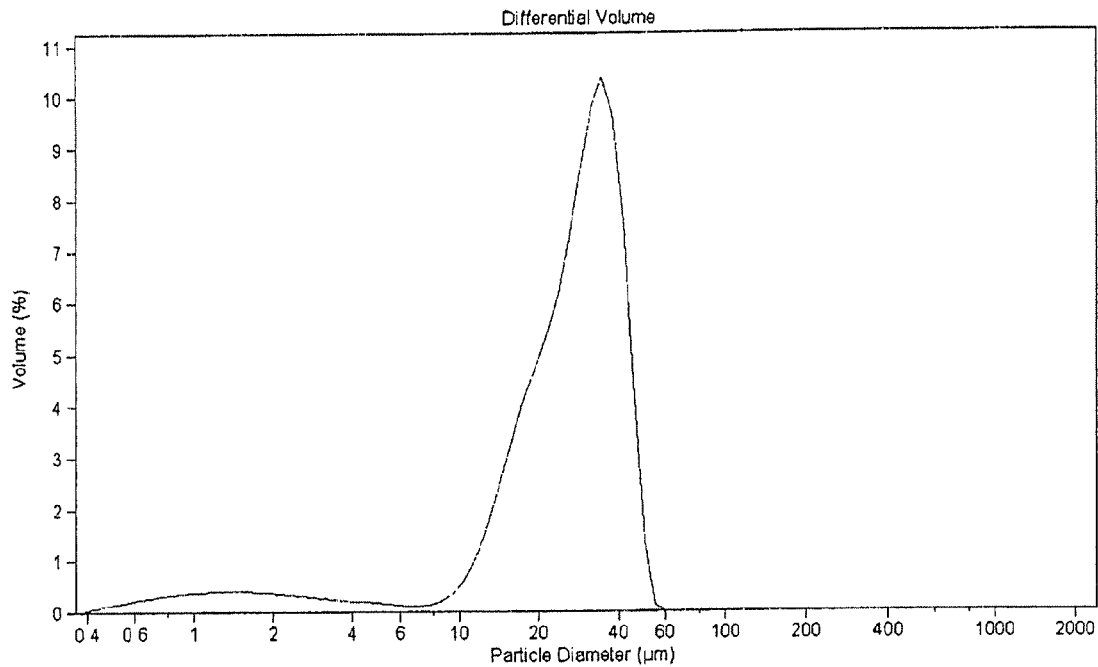
FIG. 1: is a graph illustrating the particle size distribution measured by the Coulter method of the solid catalyst particles prepared according to Example 1.

We have devised a new technique for recovering such a component from solution, which avoids the unsatisfactory precipitation previously practised and leads to an improved product morphology and consistent product composition.

According to the present invention a process for producing an olefin polymerisation catalyst component in the form of particles having a predetermined size range, comprises preparing a solution of a complex of a Gp 2 metal and an electron donor by reacting a compound of said metal with said electron donor or a precursor thereof in an organic liquid reaction medium; reacting said complex, in solution, with a compound of a transition metal to produce an emulsion the dispersed phase of which contains more than 50 mol % of the Gp 2 metal in said complex; maintaining the particles of said dispersed phase within the average size range 5 to 200 µm by agitation in the presence of an emulsion stabilizer and solidifying said particles; and recovering, washing and drying said particles to obtain said catalyst component.

The compound of a transition metal is preferably a compound of a Group 4 metal. The Group 4 metal is preferably titanium, and its compound to be reacted with the complex of a Gp 2 is preferably a halide. In a further embodiment of the invention a compound of a transition metal used in the process can also contain organic ligands typically used in the field known as a single site catalyst. In a still further embodiment of the invention a compound of a transition metal can also be selected from Group 5 metals, Group 6 metals, Cu, Fe, Co, Ni and/or Pd. The complex of the Group 2 metal is preferably a magnesium complex. The invention will henceforth be described in relation to a preferred embodiment of the process, namely to a process for the preparation of a Ziegler-Natta type catalyst.

A preferred embodiment of the invention is a process for producing catalysts of the Ziegler-Natta type, in the form of particles having a predetermined size range, comprising: preparing a solution of magnesium complex by reacting an alkoxy magnesium compound and an electron donor or precursor thereof in a $C_6$-$C_{10}$ aromatic liquid reaction medium; reacting said magnesium complex with a compound of at least one IV valent Gp 4 metal at a temperature greater than 10° C. and less than 60° C., to produce an emulsion of a denser, $TiCl_4$/toluene-insoluble, oil dispersed phase having, Gp 4 metal/Mg mol ratio 0.1 to 10 in an oil disperse phase having Gp 4 metal/Mg mol ratio 10 to 100; maintaining the droplets of said dispersed phase within the size range 5 to 200 µm by agitation in the presence of an emulsion stabilizer while heating the emulsion to solidify said droplets; and recovering, washing and drying the solidified particles to obtain said catalyst component.

The said disperse and dispersed phases are thus distinguishable from one another by the fact that the denser oil, if contacted with a solution of titanium tetrachloride in toluene, will not dissolve in it. A suitable solution for establishing this criterion would be one having a toluene mol ratio of 0.1 to 0.3. They are also distinguishable by the fact that the great preponderance of the Mg provided (as complex) for the reaction with the Gp 4 metal compound is present in the dispersed phase, as revealed by comparison of the respective Gp 4 metal/Mg mol ratios.

In effect, therefore, virtually the entirety of the reaction product of the Mg complex with the Gp 4 metal—which is the precursor of the ultimate catalyst component—becomes the dispersed phase, and proceeds through the further processing steps to final dry particulate form. The disperse phase, still containing a useful quantity of Gp 4 metal, can be reprocessed for recovery of that metal.

The production of a two-phase, rather than single-phase (as in prior practice) reaction product is encouraged by carrying out the Mg complex/Gp 4 metal compound reaction at low temperature, specifically above 10° C. but below 60° C., preferably between above 20° C. and below 50° C. Since the two phases will naturally tend to separate into a lower, denser phase and supernatant lighter phase, it is necessary to maintain the reaction product as an emulsion by agitation in the presence of an emulsion stabiliser.

The resulting particles of the dispersed phase of the emulsion are of a size, shape (spherical) and uniformity which render the ultimate catalyst component extremely effective in olefin polymerisation. This morphology is preserved during the heating to solidify the particles, and of course throughout the final washing and drying steps. It is, by contrast, difficult to the point of impossibility to achieve such morphology through precipitation, because of the fundamental uncontrollability of nucleation and growth, and the large number of variables, which affect these events.

The electron donor is preferably an aromatic carboxylic acid ester, a particularly favoured ester being dioctyl phthalate. The donor may conveniently be formed in situ by reaction of an aromatic carboxylic acid chloride precursor with a $C_2$-$C_{16}$ alkanol and/or diol. The liquid reaction medium preferably comprises toluene.

Furthermore, emulsifying agents/emulsion stabilisers can be used additionally in a manner known in the art for facilitating the formation and/or stability of the emulsion. For the said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched $C_{12}$ to $C_{20}$ acrylates such as poly(hexadecyl)-methacrylate and poly(octadecyl)-methacrylate.

It has been found that the best results are obtained when the Gp 4 metal/Mg mol ratio of the denser oil is 1 to 5, preferably 2 to 4, and that of the disperse phase oil is 55 to 65. Generally the ratio of the mol ratio Gp 4 metal/Mg in the disperse phase oil to that in the denser oil is at least 10.

Solidification of the dispersed phase particles by heating is suitably carried out at a temperature of 70-150° C., usually at 90-110° C. Preparation of the magnesium complex may be carried out over a wide range of temperatures, 20 to 80° C. being preferred, 50 to 70° C. most preferred.

The finally obtained catalyst component is desirably in the form of particles having an average size range of 10 to 200 μm, preferably 20 to 50 μm.

The present invention further comprehends an olefin polymerisation catalyst comprising a catalyst component prepared as aforesaid, in association with an alkyl aluminium cocatalyst, and optionally with external donors, and the use of that polymerisation catalyst for the polymerisation of $C_2$ to $C_{10}$-olefins.

The reagents can be added to the reaction medium in any order. However it is preferred that in a first step the alkoxy magnesium compound is reacted with a carboxylic acid halide precursor of the electron donor to form an intermediate; and in a second step the obtained product is further reacted with the Gp 4 metal. The magnesium compound preferably contains from 1 to 20 carbon atoms per alkoxy group, and the carboxylic acid should contain at least 8 carbon atoms.

Reaction of the magnesium compound, carboxylic acid halide and polyhydric alcohol proceeds satisfactorily at temperatures in the range 20 to 80° C., preferably 50 to 70° C. The product of that reaction, the "Mg complex", is however reacted with the Gp 4 metal compound at a lower temperature, contrary to previous practice, to bring about the formation of a two-phase, oil-in-oil, product.

Use of the aromatic medium for preparation of the Mg complex contributes to consistent product morphology and higher bulk density. Catalyst bulk density and morphology correlate with product bulk density and morphology the so-called "replication effect".

The technique adopted in the novel regimen of the invention is inherently more precise than that formerly employed, and thus further contributes to product consistency, as well as sharply reducing the volumes of solvent to be handled and thus improving process economics.

The reaction medium used as solvent can be aromatic or a mixture of aromatic and aliphatic hydrocarbons, the latter one containing preferably 5-9 carbon atoms, more preferably 5-7 carbon atoms, or mixtures thereof. Preferably, the liquid reaction medium used as solvent in the reaction is aromatic and is more preferably selected from hydrocarbons such as substituted and unsubstituted benzenes, preferably from alkylated benzenes, even more preferably from toluene and the xylenes, and is most preferably toluene. The molar ratio of said aromatic medium to magnesium is preferably less than 10, for instance from 4 to 10, preferably from 5 to 9.

The recovered particulate product is washed at least once, preferably at least twice, most preferably at least three times with a hydrocarbon, which preferably is selected from aromatic and aliphatic hydrocarbons, preferably with toluene, particularly with hot (e.g. 90° C.) toluene. A further wash is advantageously performed with heptane, most preferably with hot (e.g. 90° C.) heptane, and yet a further wash with pentane. A washing step typically includes several substeps. A favoured washing sequence is, for example, one wash with toluene at 90° C., two washes with heptane at 90° C. and one or two washes with pentane at room temperature.

The washing can be optimized to give a catalyst with novel and desirable properties. Finally, the washed catalyst component is dried, as by evaporation or flushing with nitrogen.

It is preferable that the intermediates as well as the final product of the process be distinct compounds with an essentially stoichiometric composition. Often, they are complexes. A complex is, according to Römpps Chemie-Lexicon, 7. Edition, Franckh'sche Verlagshandlung, W. Keller & Co., Stuttgart, 1973, page 1831, "a derived name of compounds of higher order, which originate from the combination of molecules,—unlike compounds of first order, in the creation of which atoms participate".

The alkoxy magnesium compound group is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesiums, alkyl magnesium alkoxides, alkyl magnesium halides and magnesium dihalides. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a magnesium dihalide such as magnesium dichloride or a dialkyl magnesium of the formula $R_2Mg$, wherein each one of the two Rs is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an octyl group, i.e. the dialkyl magnesium compound is butyl octyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium, alkyl magnesium alkoxide or magnesium dihalide can react with a polyhydric alcohol R'(OH)$_m$, or a mixture thereof with a monohydric alcohol R'OH.

Typical $C_2$ to $C_6$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5pentanediol, 1,6-hexanediol, 1,8-octanediol, pinacol, diethylene glycol, triethylene glycol, and triols such as glycerol, methylol propane and pentareythritol. The polyhydric alcohol can be selected on the basis of the activity and morphology it gives the catalyst component.

The aromatic reaction medium may also contain a monohydric alcohol, which may be straight- or branched-chain. Typical $C_1$-$C_{20}$ monohydric alcohols are methanol, ethanol, n-propanol, iso-propanol, n-butanol, iso-butanol, sec.butanol, tert.butanol, n-amyl alcohol, iso-amyl alcohol, sec.amyl alcohol, tert.amyl alcohol, diethyl carbinol, akt.amyl alcohol, sec.isoamyl alcohol, tert.butyl carbinol. Typical $C_6$-$C_{10}$ monohydric alcohols are hexanol, 2-ethyl-lbutanol, 4-methyl-2-pentanol, 1-heptanol, 2-heptanol, 4-heptanol, 2,4-dimethyl-3pentanol, 1-octanol, 2-octanol, 2-ethyl-1-hexanol, 1-nonanol, 5-nonanol, diisobutyl carbinol, 1-decanol and 2,7-dimethyl-2-octanol. Typical >$C_{10}$ monohydric alcohols are n-1-undecanol, n-1-dodecanol, n-1-tridecanol, n-1-tetradecanol, n-1-pentadecanol, 1-hexadecanol, n-1-heptadecanol and n-1-octadecanol. The monohydric alcohols may be unsaturated, as long as they do not act as catalyst poisons.

Preferable monohydric alcohols are those of formula R'OH in which R' is a $C_2$-$C_6$ alkyl group, most preferably a $C_4$-$C_{12}$ alkyl group, particularly 2-ethyl-1-hexanol.

Preferably, essentially all of the aromatic carboxylic acid ester is a reaction product of a carboxylic acid halide, preferably a dicarboxylic acid dihalide, more preferably an unsaturated α,β-dicarboxylic acid dihalide, most preferably phthalic acid dichloride, with the monohydric alcohol.

The compound of a four-valent Gp 4 metal compound containing a halogen is preferably a titanium tetrahalide. Equivalent to titanium tetrahalide is the combination of an alkoxy titanium halide and a halogenation agent therefore, which are able to form a titanium tetrahalide in situ. The most preferred halide is the chloride, for zirconium and hafnium as well as for titanium.

The reaction conditions used in the claimed process may be varied according to the used reactants and agents.

As is known, the addition of at least one halogenated hydrocarbon during the process can lead to further improved catalytic activity. Reactive halogenated hydrocarbons preferably have the formula R'''X'''$_n$ wherein R''' is an n-valent $C_1$-$C_{20}$ hydrocarbyl group, particularly a $C_1$-$C_{10}$ paraffin, X''' is a halogen and n is an integer from 1 to 4.

Such chlorinated hydrocarbons include monochloromethane, dichloromethane, trichloromethane (chloroform), tetrachloromethane, monochloroethane, (1,1)-dichloroethane, (1,2)-dichloroethane, (1,1,1)-trichloroethane, (1,1,2)-trichloroethane, (1,1,1,2)-tetrachloroethane, (1,1,2,2) tetrachloroethane, pentachloroethane, hexachloroethane, (1)-chloropropane, (2)-chloropropane, (1,2)-dichloropropane, (1,3)-dichloropropane, (1,2,3)trichloropropane, (1)-chlorobutane, (2)-chlorobutane, isobutyl chloride, tert.butyl chloride, (1,4)-dichlorobutane, (1)-chloropentane, (1,5)-dichloropentane. The chlorinated hydrocarbons may also be unsaturated, provided that the unsaturation does not act as catalyst poison in the final catalyst component.

In the above formula, R''' is preferably a mono- or bivalent $C_1$-$C_{10}$ alkyl group, independently, X''' is preferably chlorine and, independently, n is preferably 1 or 2. Preferred compounds include butyl chloride (BuCl), dichloroalkanes such as (1,4)-dichlorobutane, and tertiary butyl chloride.

Though the catalyst preparation according to the inventive method can be carried out batchwise, it is also preferable and possible to prepare the catalyst component semi-continuously our continuously. In such semi-continuous or continuous process, the solution of the complex of the Group 2 metal and said electron donor, which is prepared by reacting the compound of said metal with said electron donor in an organic liquid reaction medium, is mixed with at least one compound of a transition metal, which might be solved in the same or different organic liquid reaction medium. The so obtained solution is then agitated, possibly in the presence of an emulsion stabilizer, and then the so-agitated emulsion is fed into a temperature gradient reactor, in which the emulsion is subjected a temperature gradient, thus leading to solidifying the droplets of a dispersed phase of the emulsion.

When feeding said agitated emulsion to the temperature gradient reactor, an inert solvent, in which the droplets are not soluble, can additionally be fed into that gradient reactor in order to improve the droplet formation and thus leading to a uniform grain size of the particles of the catalyst component, which are formed in the temperature gradient reactor when passing through said line. Such additional solvent might be the same as the organic liquid reaction medium, which is used for preparing the solution of the complex of the Group 2 metal as explained above in more detail.

The solidified particles of the olefin polymerisation catalyst component can subsequently be recovered by an in-stream filtering unit and then, optionally after some additional washing and drying steps in order to remove unreacted starting components, can be stored for further use. In one embodiment the catalyst can be fed after washing steps into the olefin polymerisation reactor, so that a continuous preparation and fed to the reactor is guaranteed.

As it can be seen from the above description of the semi-continuous or continuous process, it is thus possible to use separated reaction vessels for the different process steps and to transfer the reaction products which are prepared in the respective reaction vessels and to fed them in-line into further reaction vessels for formation of the emulsion and, subsequently, of the solidified particles.

It is one possibility to use a full-continuous process as the time saving in said process is remarkable. In such fully continuous process, the formation of the solidified particles could be carried out in the temperature gradient line in the kind of pipe reactor, which is sufficiently long and which is subjected said temperature gradient from the starting temperature in the lower range of 20 to 80° C. up to a "solidifying" temperature of 70 to 150° C. The temperature gradient is preferably obtained by means of heating the pipe reactor from the outside by applying normal heaters, microwaves, etc.

As mentioned before, a filtering unit might preferably be used for filtering the solidified particles from the solvent stream. For said filtering unit, various drums and sieving systems can be used, depending on the specific particle sizes.

Some preferred embodiments of the invention are described, by way of illustration, in the following Examples.

Example 1

A magnesium complex solution was prepared by slowly adding over a 40 minute period, with stirring, 110 ml of a 20% solution in toluene of BOMAG-A (Tradename) [Mg(Bu)$_{1.5}$(Oct)$_{0.5}$] to 38.9 ml of 2-ethylhexanol which had been cooled to 5° C. in a 300 ml glass reactor. During the addition the reactor contents were maintained below 15° C. The temperature was then raised to 60° C. and held at that level for 30 minutes with stirring, at which time reaction was complete.

6.4 ml phthaloyl chloride was then added over an 11 minute period. The reactor contents were stirred at 60° C. for 20 minutes, 12.9 ml 1-chlorobutane was added, and stirring continued for another 15 minutes at 60° C. The resulting stable, yellowish Mg complex solution was cooled to room temperature.

19.5 ml $TiCl_4$, 5 ml heptane and 28.7 of the above-prepared Mg complex solution were reacted at 25° C. in a 300 ml glass reactor. After 5 minutes, reaction was complete and a dark red emulsion had formed. The temperature was raised to 50° C., 2 ml of Viscoplex 1-254 (Tradename) (40-44% of acrylic polymer in base oil) was added, and the reactor contents were stirred for 30 minutes. The resulting stabilized emulsion was then heated to 90° C., with stirring, for 10 minutes to solidify the particles forming the dispersed phase. After settling and syphoning the solids (2.6 grams) underwent washing with:
1. 100 ml toluene at 90° C. for 30 minutes;
2. 60 ml heptane, at 90° C. for 20 minutes;
3. 60 ml heptane, at 35° C. for 10 minutes,
4. 60 ml pentane, at 30° C. for 5 minutes; and
5. 60 ml pentane, at 30° C. for 5 minutes.

The solids were then dried at 60° C. by nitrogen purge. The particles were established by microscopic examination to be perfectly spherical in shape. The Coulter PSD is shown in FIG. 1.

Example 2

Figure 2:
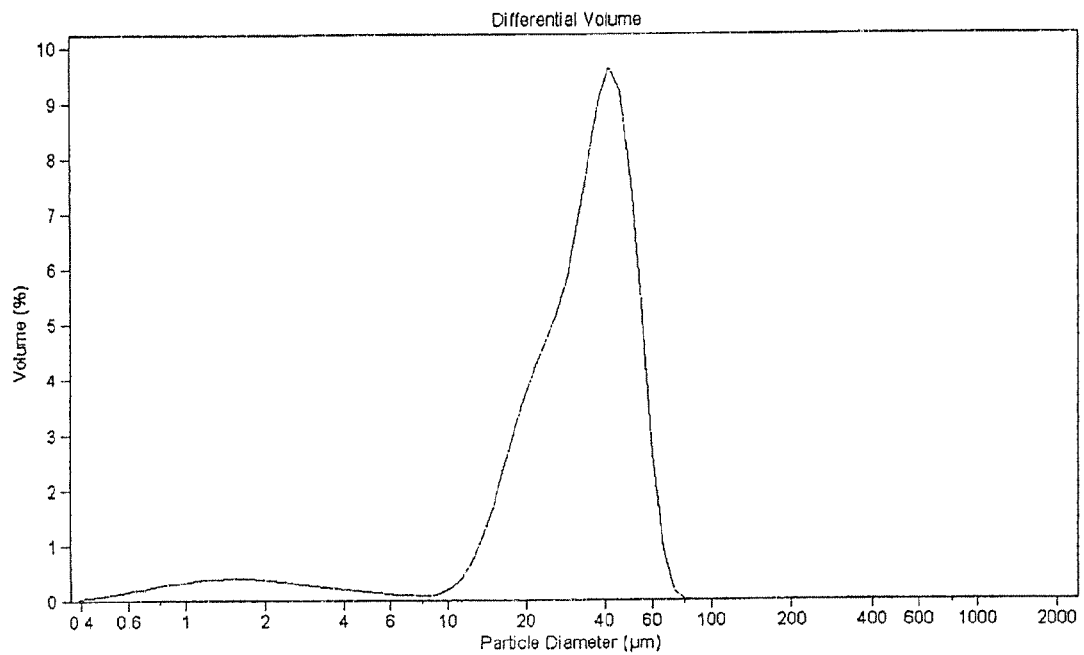
FIG. 2: is a graph illustrating the particle size distribution measured by the Coulter method of the solid catalyst particles prepared according to Example 2.

Example 1 was repeated, in order to evaluate the consistency of the procedure. The quantity of solids product was 2.6 g, the particles perfectly spherical. The Coulter PSD is shown in FIG. 2.

TABLE 1

| Example | Ti % | Mg % | Dop %* | Coulter** 10% μm | Coulter 50% μm | Coulter 90% μm |
|---|---|---|---|---|---|---|
| 1 | 3.3 | 12.6 | 27.5 | 41.6 | 28 | 11.7 |
| 2 | 2.9 | 12.6 | 27.4 | 51.9 | 33.9 | 14.2 |

*Di-ethyl-hexyl phthalate (internal electron donor)
**Measured with Coulter LS200 at room temperature with n-heptane as medium

Examples 3 and 4

The products of Examples 1 and 2 were evaluated as catalyst components in propylene polymerisation in the following manner.

0.9 ml triethyl aluminium (TEA) (co-catalyst), 0.12 ml cyclohexyl methyl dimethoxy silane (CMMS) as an external donor and 30 ml n-pentane were mixed and allowed to react for 5 minutes. Half of the mixture was then added to a polymerisation reactor and the other half was mixed with 20 mg of the components prepared in Examples 1 and 2. After an additional 5 minutes the component TEA/donor/n-pentane mixture was added to the reactor. The Al/Ti mole ratio of the resulting polymerisation catalyst was 250 mol/mol and the Al/CMMS mole ratio was 10 mol/mol.

Propylene bulk polymerisation was carried out in a stirred 5 l tank reactor.

70 mmol hydrogen and 1400 g propylene were introduced into the reactor and the temperature was raised within 15 minutes to the polymerisation temperature of 70° C. The polymerisation time at 70° C. was 60 minutes, after which the polymer formed was taken out from the reactor. Example 3 employed the catalyst containing component of Example 1 and Example 4 that of Example 2.

The results of the polymerisation evaluations are summarised in the following Table 2.

TABLE 2

| Example | Activity kgPP/gCat | MFR[1] g/10 min | XS[2] % | BD[3] g/ml | % particles <0.1 mm |
|---|---|---|---|---|---|
| 3 | 24.1 | 5.5 | 1.7 | 0.45 | 0 |
| 4 | 24.4 | 4.1 | 1.4 | 0.44 | 0 |

[1]ISO 1133, 2.16 kg load at 230° C.
[2]xylene-soluble fraction of product at 25° C.
[3]polymer-bulk density (ASTM D 1895)

The polymer particles were spherical, with a markedly narrow size distribution: more than 75% of the product was of 0.5-1.00 mm particle diameter.

Examples 5-8

In following examples poly(hexadecylmethacrylate) in different amounts (Examples 5-7) and poly(octadecylmethacrylate) (Example 8), both available from Aldrich, were used in stead of Viscoplex.
Preparation of the Soluble Mg-Complexes
Method A)

In a 150 l steel reactor 19.4 kg of 2-ethyl hexanol were added at 20° C. 56.0 kg of a 20% BOMAG A solution in toluene were then slowly added to the well stirred alcohol. The temperature of the mixture was then increased to 60° C., and the reactants were allowed to react for 30 minutes at this temperature. After addition of 5.5 kg of 1,2-phthaloyl dichloride, the reaction mixture was stirred at 60° C. for another 30 minutes to ensure complete reaction. 13.8 kg of 1-chloro butane were then added at 60° C., and stirring at this temperature was continued for 30 minutes. After cooling to room temperature a yellow solution was obtained.
Method B)

In a 300 ml glass reactor 38.9 ml of 2-ethyl hexanol were added at 20° C. 110.0 ml of a 20% BOMAG A solution in toluene were then slowly added to the well stirred alcohol. The temperature of the mixture was then increased to 60° C., and the reactants were allowed to react for 60 minutes at this temperature. After addition of 6.4 ml of 1,2-phthaloyl dichloride, the reaction mixture was stirred at 60° C. for another 60 minutes to ensure complete reaction. After cooling to room temperature a yellow solution was obtained.

Example 5

Preparation of the Catalyst Component 19.5 ml titanium tetrachloride were placed in a 300 ml glass reactor equipped with a mechanical stirrer. After addition of 5.0 ml n-heptane, 31.0 g of the Mg-complex (method A) was added to the well-stirred reaction mixture at 25° C. Mixing speed was kept constant 170 rpm through whole synthesis. After addition a dark red emulsion was formed. The temperature was increased to 50° C. and 0.9 ml poly(hexadecyl methacrylate)-toluene solution was added. After 30 min mixing, the temperature was increased to 90° C. and then after 10 min the mixing was stopped and the catalyst was let to settle. After siphoning, the solid was washed with 100 ml of toluene at 90° C. for 30 min. Then the washings were continued with two times 60 ml heptane and twice with 60 ml pentane. The first heptane washing took 20 min at 90° C. and the second one 10 min. During the second heptane wash the temperature was decreased down to c. 25° C. The pentane washing was then carried out for 5 min at c. 25° C.

Finally the solid catalyst was dried at 60° C. by purging nitrogen through the catalyst bed.

Catalyst composition is shown in TABLE 3.

Figure 3:
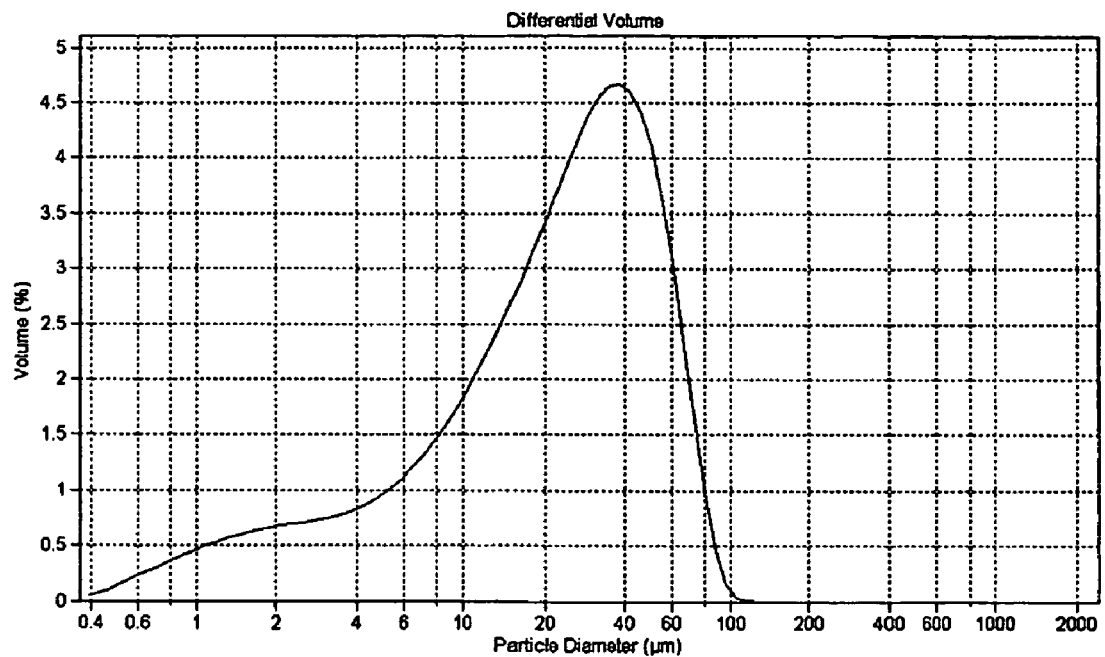
FIG. 3: is a graph illustrating the particle size distribution measured by the Coulter method of the solid catalyst particles prepared according to Example 5.

The catalyst particle size distribution by Coulter is shown in FIG. 3.

Bulk Polymerisation of Propylene

The propylene bulk polymerisation was carried out as in Example 3 but using the catalyst of example 5. Polymerisation results are disclosed in TABLE 4.

Polymer particle size distribution by sieving is disclosed in TABLE 5.

Example 6

The catalyst preparation and polymerisation were carried out as in the Example 5, except 0.45 ml poly(hexadecyl methacrylate)-toluene solution was used in catalyst preparation.

Catalyst composition is disclosed in TABLE 3 and polymerisation results in TABLE 4 and polymer particle size distribution in TABLE 5.

Figure 4:
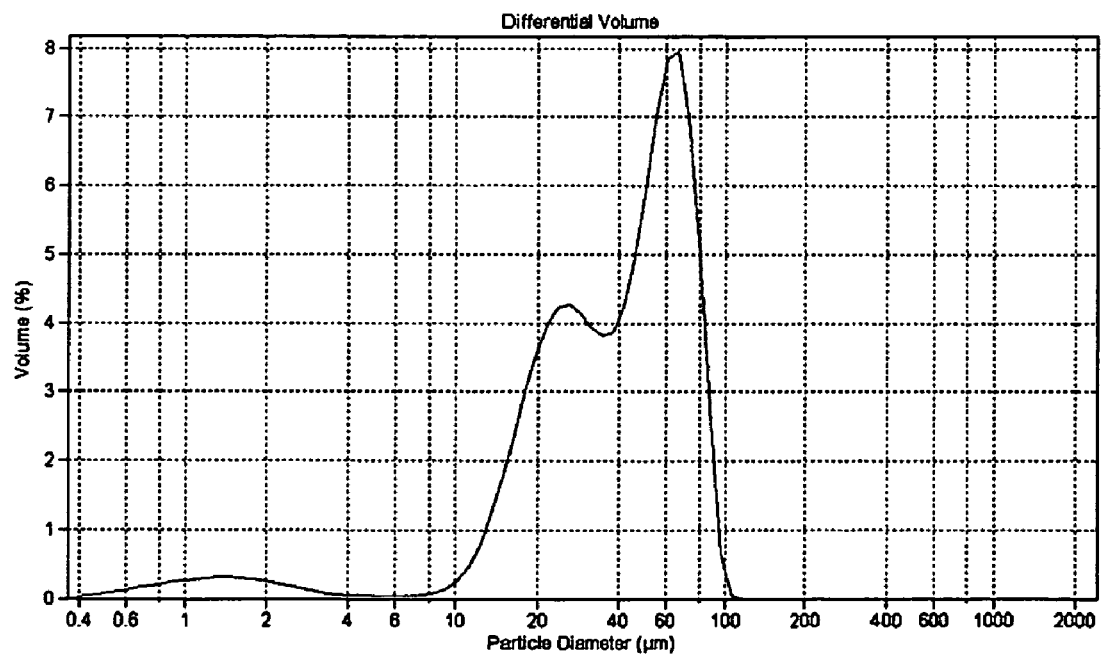
FIG. 4: is a graph illustrating the particle size distribution measured by the Coulter method of the solid catalyst particles prepared according to Example 6.

The catalyst particles were spherical and catalyst particle size distribution by Coulter is shown in FIG. 4.

Example 7

The catalyst preparation and polymerisation were carried out as in the Example 5, except 1.35 ml poly(hexadecyl methacrylate)-toluene solution was used in catalyst preparation. Catalyst composition is disclosed in TABLE 3 and polymerisation results in TABLE 4 and polymer particle size distribution in TABLE 5.

The catalyst particles were spherical.

Figure 5:
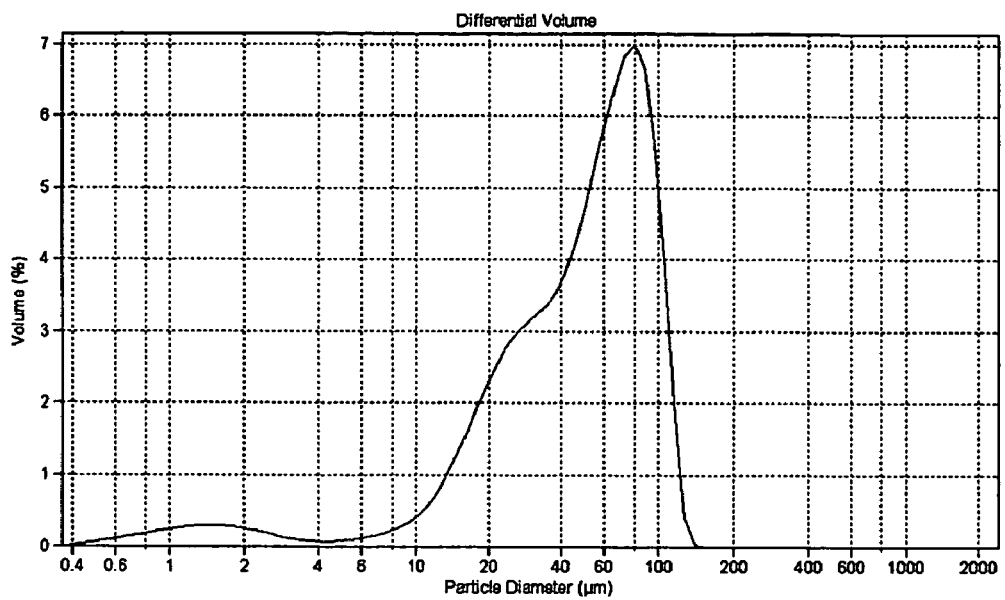
FIG. 5: is a graph illustrating the particle size distribution measured by the Coulter method of the solid catalyst particles prepared according to Example 7.

The catalyst particle size distribution by Coulter is shown in FIG. 5.

Example 8

Example 8 was done as Example 5, but Mg complex (method B) was used and the poly(octadecyl methacrylate)-toluene solution was used instead of poly(hexadecyl methacrylate).

Figure 6:
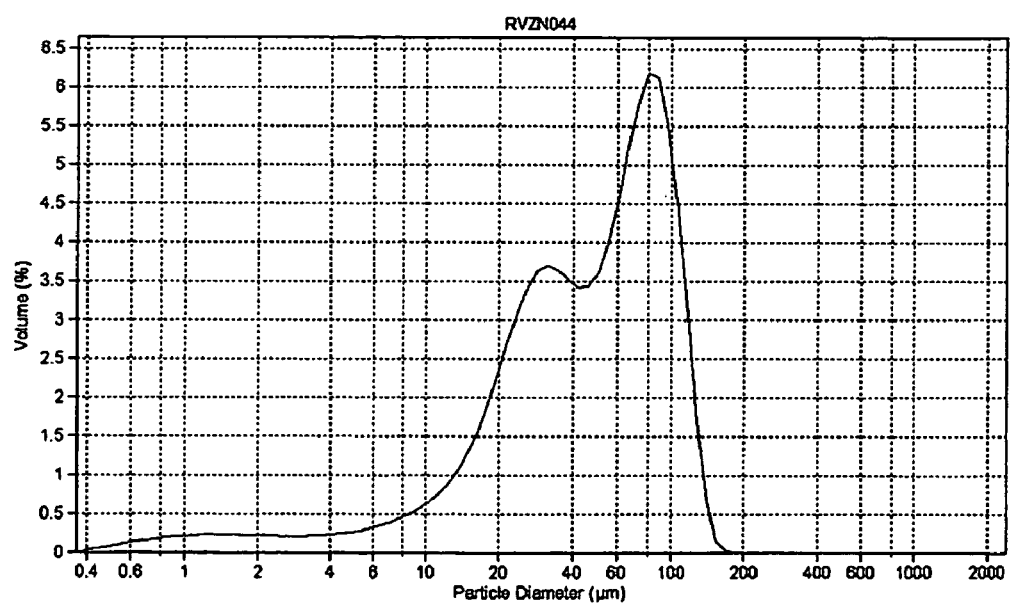
FIG. 6: is a graph illustrating the particle size distribution measured by the Coulter method of the solid catalyst particles prepared according to Example 8.

The catalyst particles were spherical. Catalyst composition is disclosed in TABLE 3 and polymerisation results in TABLE 4 and polymer particle size distribution in TABLE 5. The catalyst particle size distribution by Coulter is shown in FIG. 6.

TABLE 3

Catalyst composition

| Example | Ti % | Mg % | Cl % | DOP % |
|---|---|---|---|---|
| 5 | 2.7 | 11.0 | 40.1 | 27.1 |
| 6 | 2.8 | 14.5 | 50.6 | 27.4 |
| 7 | 2.8 | 12.7 | 45.4 | 27.5 |
| 8 | 3.2 | 13.4 | 48.6 | 26.8 |

TABLE 4

Polymerisation results

| Example | Activity kgPP/gCat | MFR g/10 min | XS % | BD G/ml |
|---|---|---|---|---|
| 5 | 34.4 | 6.2 | 2.3 | 0.42 |
| 6 | 31.1 | 6.5 | 2.3 | 0.43 |
| 7 | 21.1 | 7.0 | 2.5 | 0.44 |
| 8 | 39.5 | 4.7 | 1.8 | 0.40 |

TABLE 5

Polymer particle size distribution by sieving. % Polymer on sieves

| Example | 4 mm | 2 mm | 1 mm | 0.5 mm | 0.18 mm | 0.1 mm | 0.056 mm | pan |
|---|---|---|---|---|---|---|---|---|
| 5 | 0.7 | 24.7 | 56.9 | 14.2 | 3.2 | 0.2 | 0 | 0 |
| 6 | 6.1 | 43.1 | 31.4 | 16.7 | 2.8 | 0.1 | 0 | 0 |
| 7 | 1.1 | 35.0 | 37.7 | 24.5 | 1.4 | 0.2 | 0 | 0 |
| 8 | 16.7 | 54.4 | 18.9 | 9 | 0.7 | 0.1 | 0.1 | 0 |

The invention claimed is:

1. A process for producing an olefin polymerization catalyst component in the form of particles having a size range of 5 to 200 μm, comprising:
   preparing a solution of a complex of a Group 2 metal and an electron donor by reacting a compound of said Group 2 metal with said electron donor or a precursor thereof in an organic liquid reaction medium;
   reacting said complex, in solution, with at least one compound of a transition metal to produce an emulsion having a dispersed phase comprising more than 50 mol % of the Group 2 metal in said complex;
   obtaining droplets of said dispersed phase within an average size range of 5 to 200 μm by agitation in the presence of an emulsion stabilizer and solidifying said droplets to obtain particles; and
   recovering, washing and drying said particles to obtain said catalyst component.

2. A process according to claim 1 wherein said transition metal is a Group 4 metal.

3. A process according to claim 1 or claim 2 wherein said Group 2 metal is magnesium.

4. A process according to claim 1 or claim 2 wherein said organic liquid reaction medium comprises a $C_6$-$C_{10}$ aromatic hydrocarbon or a mixture of a $C_6$-$C_{10}$ aromatic hydrocarbon and $C_6$-$C_9$ aliphatic hydrocarbons.

5. A process according to claim 2 wherein said Group 2 metal is magnesium and said emulsion is composed of a dispersed phase oil which is a $TiCl_4$/toluene-insoluble oil having a Group 4 metal/Mg mol ratio greater than 0.1 but less than 10 and a disperse phase oil which is an oil less dense than the dispersed phase oil and which has a Group 4 metal/Mg mol ratio of 10 to 100.

6. A process according to claim 5 wherein the Group 4 metal/Mg mol ratio of said disperse phase is 20 to 80.

7. A process according to claim 5 wherein the Group 4 metal/Mg mol ratio of said disperse phase is 45 to 75.

8. A process according to claim 1 or claim 2 wherein said complex and said transition metal compound are reacted at a temperature of 10° C. to 60° C.

9. A process according to claim 1 or claim 2 wherein the solidification of said droplets is effected by heating.

10. A process according to claim 1 or claim 2 wherein said electron donor is an aromatic carboxylic acid ester.

11. A process according to claim 1 or claim 2 wherein said electron donor is di(ethyl-hexyl) phthalate.

12. A process according to claim 1 or claim 2 wherein said electron donor is formed in situ by reaction of an aromatic carboxylic acid chloride precursor with a $C_2$-$C_{16}$ alcohol and/or diol.

13. A process according to claim 1 or claim 2 wherein said liquid reaction medium comprises toluene.

14. A process according to claim 2 wherein said Group 4 metal is titanium.

15. A process according to claim 2 wherein said compound of a Group 4 metal is a Group 4 metal halide.

16. A process according to claim 3 wherein said transition metal compound is a Group 4 transition metal compound, and said magnesium complex and Group 4 metal compound are reacted at a temperature of greater than 20° C. to less than 50° C.

17. A process according to claim 1 or claim 2 wherein said emulsion stabilizer is a surfactant.

18. A process according to claim 17 wherein said surfactant comprises an acrylic polymer or a methacrylic polymer.

19. A process according to claim 5 wherein the Group 4 metal/Mg mol ratio of said dispersed phase oil is 2 to 4 and the Group 4 metal/Mg mol ratio of the disperse phase oil is 55 to 65.

20. A process according to claim 5 wherein the ratio of the Group 4 metal/Mg mol ratio in the disperse phase oil to the Group 4 metal/Mg mol ratio in the dispersed phase oil is at least 10.

21. A process according to claim 8 wherein the emulsion is heated to a temperature of 70° C. to 150° C. to solidify said droplets.

22. A process according to claim 21 wherein the emulsion is heated to a temperature of 90° C. to 110° C.

23. A process according to claim 1 or claim 2 wherein the preparation of the Group 2 metal complex is carried out at a temperature of 20° C. to 80° C.

24. A process according to claim 23 wherein the Group 2 metal is magnesium and the preparation of the magnesium complex is carried out at a temperature of 50° C. to 70° C.

25. A process according to claim 1 wherein said transition metal is a Group 5 metal and/or a Group 6 metal.

26. A process according to claim 1 wherein said transition metal is Cu, Fe, Co, Ni and/or Pd.

27. A process according to claim 1 wherein said particles have an average size range of 10 to 100 µm.

28. An olefin polymerization catalyst comprising a catalyst component prepared according to the process of claim 1 or claim 2 and an alkylaluminum cocatalyst.

29. A process for polymerizing $C_2$ to $C_{10}$ α-olefins comprising contacting the olefin polymerization catalyst of claim 28 with said olefins.

30. A process according to claim 27 wherein said particles have an average size range of 20 to 50 µm.

31. The olefin polymerization catalyst of claim 28 further comprising an external electron donor.

* * * * *